3,264,129
NON-LEAFING METALLIC PIGMENTS
Rolf Rolles, Allegheny Township, Westmoreland County, and John C. Edmunds, Lower Burrell, Pa., assignors to Aluminum Company of America, Pittsburgh, Pa., a corporation of Pennsylvania
No Drawing. Filed May 15, 1963, Ser. No. 280,718
7 Claims. (Cl. 106—290)

This invention relates to the production of non-leafing metallic flake pigments, and particularly aluminum flake pigments of the non-leafing variety, in paste and dry powder form, suitable for subsequent admixture in lacquers, enamels, and similar paint vehicles in the manufacture of polychromatic coating formulations and dried paint films exhibiting superior quality polychromatic coloring effects.

It has been disclosed in the patent art that high molecular weight aliphatic amines can be substituted for leaf-producing stearic acid in conventional dry hammer and wet ball mill disintegration of aluminum in the manufacture of dry and paste leafing aluminum pigments, reference being here made to United States Letters Patent 2,522,538, issued to Francis B. Rethwisch and Gordon M. Babcock under date of September 19, 1950. The higher molecular weight leaf-producing amines disclosed in the said patent reference, apparently capable of substitution for conventional leaf-producing stearic acid lubricant, are given as octadecylamine, tetradecyl amine and hexadecyl amine, which are all recognized as primary amines.

We have discovered that the higher molecular weight commercial grade secondary and tertiary amines, when employed as the lubricating agents in dry hammer and wet ball mill processing and manufacture of metallic flake dry powder and paste pigments, respectively, produce non-leafing metallic pigments, and that admixture of the non-leafing aluminum flake pigments so produced in polychromatic type lacquers and similar paint or coating vehicles, have resulted in providing superior quality dry polychromatic paint films to those formerly and conventionally produced from paste and dry powder non-leafing aluminum pigments manufactured with non-leafing unsaturated aliphatic fatty acid lubricants selected from presently and conventionally employed lauric, oleic, linoleic and ricinoleic acid lubricants, and mixtures thereof.

It is therefore a primary object of our invention to provide methods of processing and manufacturing non-leafing metallic flake pigments, which are admirably suited for admixture with commercially available lacquers, enamels, and similar vehicles, in the production of superior polychromatic paints and dried paint films of the same.

It is a specific object of our invention to provide a method for processing and manufacturing non-leafing aluminum flake pigments, either in dry powder or paste form, and the products so produced, in which the secondary and tertiary higher molecular weight non-leafing aliphatic amines are employed as the lubricating compound or compounds during flake disintegration of the aluminum pigments, as well as providing a non leaf-producing coating of the amine or amines on the surfaces of the final metallic flake products so produced.

In the practice of our invention, we have discovered that commercial grade straight chain secondary and tertiary higher molecular weight aliphatic amines satisfying the formulae $(R)_2NH$ and $(R)_3N$, where R identifies the aliphatic groups containing even numbers of carbon atoms between 8 and 22, constitute the class of aliphatic secondary and tertiary amine lubricants, and mixtures thereof, which are responsible for the improved results of the invention. Furthermore, we have discovered that R may be saturated or unsaturated, and in the case of the unsaturated fatty aliphatic compounds, one or more double bonds may be present in the straight chains thereof. The molecular weights of the commercial grade aliphatic secondary and tertiary amines productive of the non-leafing metallic pigments responding to the invention have been found to fall within the range 225 to 795, and their presence on the surfaces of the final metallic flake products, within the range 1 to 20 percent of the weight of the metal flakes, has been found to be preferred.

The invention has been demonstrated in commercial plant and in pilot plant performance trials. In the latter, and for actual control purposes, 6260 grams of atomized aluminum were charged into an experimental ball mill, 36 inches in diameter and 12 inches long, in the presence of 2¾ gallons of conventional volatile hydrocarbon solvent, such as mineral spirits, in admixture with between 100 to 600, preferably 280, grams of the straight chain commercial grade tertiary aliphatic amine lubricant, tri-(hydrogenated) tallow amine, having a nominal composition by weight of 5 percent $N(C_{14}H_{29})_3 + 30$ percent $N(C_{16}H_{33})_3 + 65$ percent $N(C_{18}H_{37})_3$. The mill was operated for periods ranging from 6 to 16 hours employing approximately 346 pounds of conventionally graded steel balls ranging in size from ⅛ to ¾ inch in diameter. The commercial grade of tertiary aliphatic amine lubricant employed in the aforesaid performance trials exhibited an average molecular weight of 745 to 770.

Similar performance trials of the invention were carried out substituting the straight chain commercial grade secondary aliphatic amine lubricant, di(hydrogenated) tallow amine, having a nominal composition by weight 5 percent $HN(C_{14}H_{29})_2 + 30$ percent $HN(C_{16}H_{33})_2 + 65$ percent $HN(C_{18}H_{37})_2$. The aforesaid experimental ball mill was otherwise charged and operated under the same conditions as in the previous performance tests employing commercial grade tertiary aliphatic amine lubricant, with the commercial grade substituted secondary aliphatic amine exhibiting an average molecular weight of 495 to 525.

Additional performance trials of the invention have also been carried out in the aforesaid experimental ball mill and have included wet ball-milling admixtures comprising 4000 to 8000 grams of atomized aluminum powder, 1½ to 4 gallons of volatile hydrocarbon thinners and 100 to 600 grams of at least one non-leafing lubricant selected from the group consisting of the straight chain commercial grade secondary and tertiary aliphatic amines containing an even number of carbon atoms within the range 8 to 22 and having molecular weights within the range 225 to 795, in the presence of 220 to 450 pounds of steel balls graded in size from ⅛ to ¾ inch diameter. The ball mill in these latter trials was operated within the time cycle 6 to 16 hours depending on the particle size fineness and distribution in the final non-leafing aluminum flake pigment.

Non-leafing aluminum flake paste products produced in the above-described performance trials in the form of slurries, were screened and filtered on discharge from the ball mill and thereafter adjusted, if necessary, by addition of clean volatile hydrocarbon solvent, preferably high-flash naphtha, to provide commercially acceptable paste formulations consisting essentially on a weight basis of 35 to 74.5 percent aluminum flakes, 0.5 to 10 percent of at least one of the above-named secondary and tertiary amines, and 25 to 55 percent volatile hydrocarbon solvent. The high-flash naphtha volatile hydrocarbon cut-back solvent has been indicated as preferred because of its superior compatibility with the liquid or conventional thinner portions of the majority of commercial polychromatic vehicles now employed in the paint industry.

Accurate sampling and particle size determinations were conducted on the non-leafing aluminum flake pigments prepared with the commercial grades of secondary and tertiary aliphatic amine lubricants of the invention and between 60 to 80 percent, and preferably 78 percent, of the flakes were found to fall within the particle size range 10 to 50 microns, which represents a substantial increase in distribution and number of larger or coarser flake particles than found in heretofore manufactured non-leafing aluminum flake pigments, produced with conventional non-leafing lubricants, which seldom exhibit as high as 58 percent of the flakes within the 10 to 50 micron particle size range.

Paint formulations of conventional flowable consistencies were thereafter prepared by admixture of the non-leafing aluminum flake paste pigments, produced in accordance with the above-described practices, in each of the conventional polychromatic type vehicles comprising semi-drying oil alkyds, nitrocellulose alkyds, non-drying oil alkyds modified with urea formaldehyde resins, non-drying oil alkyds modified with melamine formaldehyde resins, thermosetting acrylic solution polymers and thermoplastic acrylic solution polymers. The flowable paints so produced included the adjusted flake paste pigments in amounts between 24 to 74 grams per gallon of the vehicles, the vehicles in each instance having a non-volatile resin content of 25 to 45 percent by weight.

Conventional polychromatic color-imparting pigments were also incorporated in the paint or coating formulations described above, examples of the color pigments including the commercially available insoluble organic and inorganic dry color pigments, colors-in-oil, flushed colors, and mixtures thereof, such as phthalocyanine green, phthalocyanine blue, quinacridone red and medium chrome yellow. The color pigmentation was added in amounts of 10 to 45 percent by weight of the non-leafing aluminum flake pigmentation depending on the depth of coloration desired.

In both instances, dried films of the paints incorporating the improved non-leafing aluminum flake pigmentation of the invention, on comparison to the same paints incorporating conventional non-leafing aluminum flake pigmentation, were superior in brilliance, gloss and color purity whether the same had been color tinted or only included the improved non-leafing aluminum pigmentation of the invention. In fact, total reflectance measurements for untinted dried paint films incorporating the improved non-leafing aluminum flake pigmentation of the invention were in excess, as much as 3 to 5 percentage readings, to total reflectance readings previously recorded for dried paint films incorporating conventional non-leafing aluminum flake pigment made with oleic acid lubricant and admixed with the same polychromatic type vehicles to provide flowable paint coatings.

Total reflectance percentage measurements or readings employed in the comparative tests hereinabove reported were obtained by using a commercial Light-Sensitive Cell Reflectometer developed jointly by G. R. Baumgartner, of the Nela Park Engineering Department of General Electric Company, and A. H. Taylor, Associate Physicist of the United States Bureau of Standards, a full description of the instrument being reported in General Electric Review for November 1937, volume 40, pages 525–527.

The non-leafing aluminum flake pigmentation typical of the invention will be further appreciated and understood from the following two examples:

Example I

A specimen of a commercial production run of non-leafing aluminum flake paste pigment, produced from atomized aluminum in a wet ball-milling operation in the presence of non-leafing oleic acid lubricant and mineral spirits, was selected at random and was thoroughly admixed with a commercial nitrocellulose alkyd resin polychromatic grade vehicle to form a flowable paint of the following composition by weight based on 100 pounds of the paint:

.012—oleic acid on the aluminum flake surfaces,
.090—mineral spirits from the initial paste,
.540—high-flash naphtha from cut-back addition,
1.158—aluminum flakes,
53.600—commercial nitrocellulose alkyd vehicle containing 34.9% by weight resin content,
44.600—conventional lacquer thinner.

The aluminum flake pigment of Example I was determined to have a particle size distribution of not more than 58 percent of the number of flakes within the particle size range 10 to 50 microns.

Example II

A specimen of a production run of non-leafing aluminum flake paste pigment, produced from atomized aluminum in a wet ball-milling operation in the presence of mineral spirits and commercial grade non-leafing tri-hydrogenated tallow amine lubricant, wass elected at random and was thoroughly admixed with the same nitrocellulose alkyd resin polychromatic grade vehicle to constitute a flowable paint of the following composition by weight based on 100 pounds of the paint:

.027—tri-(hydrogenated) tallow amine lubricant on the aluminum flake surfaces,
.090—mineral spirits from the initial paste,
.540—high-flash naphtha from cut-back addition,
1.143—aluminum flakes,
53.600—commercial nitrocellulose alkyd vehicle containing 34.9% by weight resin content,
44.600—conventional lacquer thinner.

The aluminum flake pigment in Example II, a product of the invention, was determined to have a particle size distribution of at least 78 percent of the number of flakes falling within the particle size range 10 to 50 microns.

Several steel panels were separately coated with each of the paints of Examples I and II, allowed to dry in air for approximately five minutes, baked for twenty minutes at 250° F., allowed to cool to room temperature, and thereafter buff polished. Total reflectance readings, using the Taylor-Baumgartner Light-Sensitive Cell Reflectometer above referred to, averaged 41.5 percent for the dried and buff polished panels bearing the paint of Example I, as compared to an average 45 percent reading for the panels bearing the paint of Example II.

The increased total reflectance value for the painted panels of Example II was readily observable to the naked eye in terms of the clarity and depth of the natural metallic color of the aluium flake pigmentation, as compared to a dusty or frosty appearance and less specular reflectance for the painted panels of Example I.

Portions of the paint formulations of Examples I and II were each color tinted by additions thereto of 10 to 45 percent by weight of their aluminum flake pigment content of phthalocyanine green coloring pigment. The paints so produced were coated on steel panels and otherwise treated in the same manner described above for the clear aluminum painted panels to provide a series of green colored, aluminum flake pigmented, coated or painted panels.

It was clearly observed by the naked eye that the green colored painted panels, the paint for which was formulated from the composition of Example II, exhibited far superior brilliance, gloss and true color purity than did the painted panels prepared from the paint of Example I. In fact, the visually observed improvement in polychromatic color effects exhibited by the panels bearing the color tinted paint of Example II were in substantially direct proportion to the improved clarity and increased total reflectance obtained in the comparison of the clear or untinted aluminum flake pigmented dried and polished painted panels bearing the untinted paint formulations of Examples I and II.

Non-leafing dry flake aluminum pigments responding to the practice of the invention have also been prepared by vacuum drying the paste products heretofore described to drive off the volatile hydrocarbon solvent in the paste products. The commercial grade secondary and tertiary non leaf-producing aliphatic amines of the invention singly, or as mixtures thereof, can also be substituted for the conventional non leaf-producing oleic and/or lauric fatty acid lubricants in dry hammer mill disintegration and production of comminuted non-leafing dry aluminum flake pigments responding to the invention.

The substitution of the non-leafing secondary and tertiary aliphatic amines, responding to the concepts of the present invention, for the conventional non-leafing unsaturated aliphatic fatty acid lubricants comprising the group lauric, oleic, linoleic and ricinoleic acids, has in no way affected the use of conventional atomized aluminum and/or foil scrap, or similar comminuted metals, as the starting charge for wet ball-milling or dry hammer reduction to flake metal particle pigments.

Having thus described our invention in terms of basic and specific examples of the same, what we claim as novel and desire to secure by Letters Patent is:

1. The method of producing non-leafing metallic flake pigment comprising reducing the metal to a flake particle size distribution of 60 to 80 percent within 10 to 50 microns in the presence of at least one non-leafing lubricant selected from the group consisting of the straight chain secondary and tertiary aliphatic amines characterized by an aliphatic group containing an even number of carbon atoms within the range 8 to 22 and a molecular weight within the range 225 to 795, and providing the straight chain non-leafing lubricant in amounts between 1 to 20 percent by weight of the metal undergoing reduction.

2. The method of producing non-leafing aluminum flake pigment comprising reducing the aluminum to a flake particle size distribution of 60 to 80 percent within 10 to 50 microns in the presence of at least one non-leafing lubricant selected from the group consisting of the straight chain secondary and tertiary aliphatic amines characterized by an aliphatic group containing an even number of carbon atoms within the range 8 to 22 and a molecular weight within the range 225 to 795, and providing the straight chain non-leafing lubricant in amounts between 1 to 20 percent by weight of the aluminum undergoing reduction.

3. The method of producing non-leafing aluminum flake pigment for subsequent admixture with a vehicle to produce a polychromatic coating formulation, the steps comprising, subjecting aluminum in comminuted form to mechanical reduction thereof to a flake particle size distribution of 60 to 80 percent of the flakes within 10 to 50 microns in the presence of at least one non-leafing lubricant selected from the group consisting of the straight chain secondary and tertiary aliphatic amines satisfying the formulae $(R)_2NH$ and $(R)_3N$, respectively, where R identifies the aliphatic groups containing even numbers of carbon atoms between 8 and 22 and the molecular weight of the lubricant is within the range 225 to 795, and providing the lubricant in amounts between 1 to 20 percent by weight of the aluminum undergoing reduction.

4. The method of producing non-leafing aluminum flake pigment paste comprising the steps, charging a ball mill with a mixture consisting essentially of atomized aluminum, a non-leafing lubricant selected from the group consisting of the straight chain secondary and tertiary aliphatic amines characterized by an aliphatic group containing an even number of carbon atoms between 8 and 22, steel balls and volatile hydrocarbon solvent in amount to produce a wet slurry mixture, operating the so charged ball mill for from 6 to 16 hours to reduce the aluminum to a flake particle size distribution of 60 to 80 percent of the number of flakes within 10 to 50 microns, discharging the ball mill of its charge, separating the steel balls from the wet slurry, filtering the remaining slurry to provide an aluminum flake paste cake, and adding high-flash naphtha to the cake to produce an aluminum paste flake pigment.

5. A metallic flake pigment consisting essentially of a flake particle size distribution of 60 to 80 percent of the number of flakes within 10 to 50 microns, a film coating on the individual flakes of at least one higher molecular weight non-leafing aliphatic amine selected from the group consisting of the straight chain secondary and tertiary amines characterized by an aliphatic group containing an even number of carbon atoms within the range 8 to 22 and a molecular weight within the range 225 to 795, and the amount of the straight chain amine being present between 1 to 20 percent by weight of the metallic flakes.

6. An aluminum flake pigment consisting essentially of a flake particle size distribution of 60 to 80 percent of the number of flakes within 10 to 50 microns, a non-leafing film coating on the individual flakes of at least one higher molecular weight aliphatic amine selected from the group consisting of the saturated and unsaturated straight chain secondary and tertiary amines characterized by an aliphatic group containing an even number of carbon atoms within the range 8 to 22 and a molecular weight within the range 225 to 795, and the amount of the straight chain amines being present between 1 to 20 percent by weight of the aluminum flakes.

7. A non-leafing aluminum flake pigment compatible with nitrocellulose alkyd resin polychromatic vehicle in formulating polychromatic coatings, said aluminum flake pigment consisting essentially of a flake particle size distribution of 60 to 80 percent of the number of flakes within 10 to 50 microns, a film coating on the individual flakes of at least one higher molecular weight non-leafing aliphatic amine selected from the group consisting of the straight chain secondary and tertiary amines characterized by an aliphatic group containing an even number of carbon atoms within the range 8 to 22 and a molecular weight within the range 225 to 795, and the amount of straight chain amine being present between 1 to 20 percent by weight of the aluminum flakes.

References Cited by the Examiner
UNITED STATES PATENTS 2,522,538  9/1950  Rethwisch et al. _____ 106—290

TOBIAS E. LEVOW, *Primary Examiner.*

J. POER, *Assistant Examiner.*